United States Patent [19]

Cruaud et al.

[11] Patent Number: 5,478,390
[45] Date of Patent: Dec. 26, 1995

[54] CUTTABLE CONCRETE, ITS PROCESS OF MANUFACTURE AND ITS PROCESS OF MOLDING

[76] Inventors: William Cruaud, 14 rue de la Mairie-La possonnière; Christian Cruaud, La Piquoiterie - La Possonière, both of 49170 Saint Georges sur Loire, France

[21] Appl. No.: 256,194
[22] PCT Filed: Jan. 1, 1993
[86] PCT No.: PCT/FR93/00011
    § 371 Date: Jun. 30, 1994
    § 102(e) Date: Jun. 30, 1994
[87] PCT Pub. No.: WO93/14043
    PCT Pub. Date: Jul. 22, 1993

[30] Foreign Application Priority Data

Jan. 9, 1992 [FR] France ............................ 92 00165

[51] Int. Cl.⁶ .............................. C04B 7/13; C04B 14/28
[52] U.S. Cl. ........................ 106/713; 106/715; 106/721; 106/738; 106/792; 106/817
[58] Field of Search ..................... 106/817, 738, 106/713, 721, 704, 792, 772, 715, 796

[56] References Cited

U.S. PATENT DOCUMENTS

| | | | |
|---|---|---|---|
| 452,037 | 5/1891 | St. John | 106/738 |
| 1,805,431 | 5/1931 | Ryder | 106/738 |
| 2,758,033 | 8/1956 | Burney, Jr. et al. | 106/738 |
| 3,169,877 | 2/1965 | Bartoli et al. | 106/738 |
| 4,026,716 | 5/1977 | Urschel, III et al. | 106/738 |
| 4,613,649 | 9/1986 | Saeki et al. | 524/650 |

FOREIGN PATENT DOCUMENTS

| | | | |
|---|---|---|---|
| 0140826 | 5/1985 | European Pat. Off. | 106/738 |
| 2520349 | 7/1983 | France. | |
| 2635772 | 3/1990 | France. | |
| 0030073 | 1/1985 | Germany. | |
| 3524796 | 1/1986 | Germany. | |
| 0001140 | 2/1916 | Netherlands. | |

*Primary Examiner*—Paul Marcantoni
*Attorney, Agent, or Firm*—Young & Thompson

[57] ABSTRACT

Cuttable concrete capable of being cut and sculpted with traditional tools and process for the manufacture and moulding thereof. The concrete consists of a mixture of a volume V of mineral material essentially in the form of crushed oolitic limestone, a volume V1, less than V, of a carbonated binder, preferably lime and/or cement based, and excess water. The cuttable concrete is useful in the building industry, interior decoration, urban fittings and the manufacture of casting moulds.

9 Claims, No Drawings

CUTTABLE CONCRETE, ITS PROCESS OF MANUFACTURE AND ITS PROCESS OF MOLDING

FIELD OF THE INVENTION

The invention relates cuttable concrete adapted to be cut and sculpted with conventional sculpting tools during if desired several months as well as the process for production permitting its obtention and a process for molding permitting its use.

BACKGROUND OF THE INVENTION

It is well known that conventional concretes such as silicious concretes have, and this for an extremely short time, only a very slight capacity for being shaped after demolding. Because of this, the hardening times do not permit using complicated moldings for reworking. This very low capability for shaping requires the design and production of moldings or molds which are extremely sophisticated so as to permit reproductions of shape or of architectural molding. On the other hand, for economical reasons, it is very often necessary to consider the employment of framework or molds requiring series which, in the case of the ornamentation of facades, harden in repetitions of shaped modules.

In the field of concrete, there has already been used granulated limestone to give to the concrete individual characteristics different from those of silicious concretes.

Thus, the patent FR-A-2.520.349 describes a process for the production of an artificial or synthetic stone using successively the steps of:

mixing the ingredients:
  limestone sand; 18 to 24%
  silicious sand; 35 to 45%
  white lime and cement; 33 to 40%
  water
casting in molds
demolding
hardening (naturally)
sand blasting (adapted to imitate the external appearance of a natural stone).

This artificial stone is distinguished from that of the invention by its content of silica and a hydraulic binder which do not permit slow hardening of the assembly as well as by the quantity of water which, in a just sufficient quantity, is equivalent to about 10% by volume of the total volume. Similarly, the molding process, which requires the drying of the product at a temperature of 35° to 40° C., differs from the molding process generally used in the framework of the present invention.

The patent FR-A-2.584.707 describes itself a process for production of a reconstituted limestone characterized by the fact that it consists in preparing a mixture of:

White cement from 10 to 40%, preferably 22 to 28%
Limestone in granulated form and if desired powder, 40 to 80%, preferably 60 to 66%
Water 5 to 50%, preferably 11%
Plasticizer 0 to 5%, preferably 1% that is mixed in a horizontal mixer, before compacting by tamping within the molds, or by liquid pouring into the molds which are then vibrated manually or even mechanically. This process is distinguished from the invention by its step of vibrating which, in the case of the process of the invention, is strongly discouraged because it gives rise to segregation of the elements entering into the composition of the concrete rendering the latter useless for all shaping, demolding, cutting and sculpting in contrast to all the conventional processes in which the vibration gives rise to the binding of the various elements. This observation is applicable in the same way to the patent FR- A-2.414.028.

Finally, the patents FR-A-1.291.011 and 1.248.052 describe an artificial stone and an agglomerate which, although having similar compositions to those of the concrete of the present invention, do not have the essential characteristics of this latter by reason of the portions of the completely different components and of the lack of use of the specific limestones.

SUMMARY OF THE INVENTION

The object of the present invention is therefore to provide a cuttable concrete whose hardness and properties of mechanical resistance permit its use in a conventional concrete but which has the property of being adapted to be cut for several months with conventional sculpting tools.

Another object of the present invention is to provide a concrete whose composition is such to permit its use in coffering, in plastering, in facing stone, etc.

To this end, the invention has for its object a cuttable concrete adapted to be cut for several months by means of sculpting tools and in conventional cuts, characterized in that it is constituted by at least a mixture of a volume V of mineral materials present essentially in the form of crushed oolithic limestones, of a volume V1 less than V of carbonated binder preferably based on lime and/or cement, of a volume V3 of an excess of water.

According to a preferred embodiment of the invention, the sum of the volumes V and V3 represent 55 to 90% of the total volume of the mixture and the volume of water V3 is 30 to 90% of the volume V of oolithic limestone, preferably 80 to 90% of V.

The invention also relates to a process for the production of a concrete, characterized in that there is crushed a volume V of mineral materials based essentially on oolithic limestones, in that there is added to this volume V:

a volume V1 of binder which is 20 to 60% of V
a volume V2 of high hardness filler which is 0 to 40% of V and
a volume V3 of water which is 30 to 80% of V.

The invention further relates to a process for molding this concrete, characterized in that a biocompatible framework is produced and emplaced, permitting the introduction of the filler into the interior of the material, in that there is cast the composition in an excessive quantity within the mold, in that the composition is allowed to set up, in that it is demolded, in that the upper sides of the composition are cut by means of traditional cutting and sculpting tools.

Other characteristics and advantages of the invention will become apparent from the reading of the detailed description which follows, given here solely by way of example.

DETAILED DESCRIPTION OF THE INVENTION

To obtain a cuttable concrete adapted to be cut cleanly with the assistance of conventional manual cutting tools over a long period of time, the steps of the process for production must be precisely followed. These steps comprise, in the first instance, a crushing of the limestone materials. These limestone materials have, at least some of them, a type of carbonate of crystalline morphology and a particular structure. The most suitable limestones are oolithic limestones. This oolithic limestone is for example a homogenous cretaceous limestone of medium grain size of an apparent volume mass of 2000 kg/m³, of a porosity of 26 to 28%, of a resistance to compression of 18 to 28 MPA, with a speed of propagation of 2700 to 2800 m/s, so called semi-hard, having undergone an inspection and a treatment controlling the water content for purposes of crushing so as to obtain the crushed material in which all the granules from the smallest to the largest (from 0.05 to 25 mm) are calibrated. The oolithic limestones are limestones formed of oolites, which is to say small rounded granules of small size. Each granule is formed of layers of concentric limestones about a small grain such as a grain of sand. The oolithic limestones can no longer display an arrangement in concentric layers when the small rounded cavities existing in the limestones are filled with homogenous material of calcite. It can be supposed that the small size grains constitute a stable colloidal solution during the time of setting up. Once these limestone materials are crushed, there is added water, a binder and if desired high hardness fillers.

For a total volume VT of the mixture, if V represents the volume of crushed oolithic limestone, V1 the volume of carbonated binder generally constituted by lime and/or cement of the Portland type, V2 the volume of high hardness fillers of the type of corundum, silica, nylon spheres or the like which promote the compacting of the mixture, V3 the volume of water in excess, there are established the following relations between V, V1, V2 and V3:

$20\% \times V \leqq V1 \leqq 60\% \times V$ $0\% \times V \leqq V2 \leqq 40\% \times V$ $30\% \times V \leqq V3 \leqq 90\% \times v$ (A)

$50\% \times VT \leqq V+V3 \leqq 90\% \times VT$

It will be noted that the excess water constituted by the volume V3 is probably the basis for the interesting properties of this concrete, namely its ability to undergo fine cutting with manual tools such as hammers, chisels, mallets, and other conventional stone cutting tools for up to 180 days. At 180 days or less, as a function of the composition of the binder, there is obtained a mechanical resistance of the concrete of the same order as that of conventional concrete. Moreover, this composition can be added to reinforceable conventional concrete. Finally, this composition is itself reinforceable and castable monolithically in a manner identical to conventional concrete. In the course of hardening, it is possible to add by vaporization or any other known method hardeners and other products so as to give to the concrete supplemental characteristics (polish, color, patina).

It will also be noted that V3, the volume of water added to the mixture, is close to V and corresponds therefore to the upper portion of the region (A) indicated above in the case of a coffered or molded type application of the concrete but on the contrary it is comprised in the lower portion of the region (A) mentioned above in the case of a coating application. As to the proportions of the binder, these are various functions of the desired period of cuttability.

EXAMPLE 1:

Thus, a preferred composition for the production of concrete cuttable during a period of six to eight months is the following:

volume V of crushed oolithic limestone: 48 liters, volume V2 of high hardness fillers: 0 volume of binder V1 equal to 11.5 liters, namely 24% of V, the proportion of lime and cement in the binder being optional, volume V3 of water equal to about 36 liters, namely 75% of V.

This concrete is cuttable for six to eight months. There will preferably be used, as the oolithic limestone, a so-called soft oolithic limestone.

EXAMPLE 2:

Another preferred composition for the production of concrete cuttable for a period of two days to two months is the following:

volume V of crushed oolithic limestone: 48 liters, volume V1 of carbonated binder: 15 liters, namely 31% of V, volume V2 of high hardness fillers: 10 liters, namely 21% of V, volume v3 of water: 36 liters, namely 75% of V.

It will be noted that the volume V plus to the volume V3 represents 85% of the total volume $V_T$ of the mixture.

Because of the cost of the limestone materials and of water, there is achieved a particularly inexpensive concrete.

EXAMPLE 3:

A preferred composition for the production of a cuttable coating is the following:

volume V of semi-hard crushed limestone material: 48 liters, volume V1 of hydraulic binder: 15 liters, namely 31% of V, volume V2 of high hardness fillers: 10 liters, namely 21% of V, volume V3 of added water: 22 liters, namely 46% of V.

It will be noted again that the sum of V plus V3 is 74% of the total mixture.

Obviously, it is possible in each of the mentioned examples to use as crushed oolithic limestone a mixture of hard, semi-hard and soft sands.

Finally, it is also possible, with compositions of this type, to provide surface coatings by adding and/or stratifying this concrete with molded plaster or with resin or with concrete present in the form of fibers. It is also possible to use this concrete for the production of plates adapted to constitute paving stones.

In this case, there will be used a composition of proportions analogous to those recited for concrete on a panel of variable composition so as to provide a slab or plates for interior decoration.

Another preferable use of concrete according to the invention is the production of refractory molds for casting of materials to be melt cast or to be hardened when cold.

The uses mentioned above and the production of this concrete do not in any case constitute a complete and limiting list.

In the case of concrete adapted for the production of supporting or self supporting structures, such as facades, the casting of the concrete is effected in coffrage of conventional types such as wall molds, metal or wood coffering conventionally employed in this activity. It is to be noted that the coffering is effected with overfilling, which is to say that the initial filling is greater than the final filling. To do this, there is shaped and arranged a biocompatible armature permitting introducing fillers to the interior of the material, the composition is cast in excess quantity within the coffering, the composition is allowed to set up, is demolded, the upper excess filling of the composition is cut away by means of conventional cutting and sculpting tools.

It is possible in certain cases of use of this concrete to provide within the body of the coffering openings for a drain so as to eliminate excess water.

Thus, by way of example of construction using this process, there can be produced a wall six meters long by 15 meters high of a thickness from 6 cm to 1 meter. The wall has been cast according to the principle described above, demolding being effected after eight days, the first cutting, the so called dressing, taking place between the tenth day and the sixtieth day, the so called final cutting taking place between the fortieth and hundredth day. The polishing of the concrete of the present invention takes place between the eightieth to the one hundred and twentieth day. The final sculpting, ornamentation and fine cutting are effected between the hundredth and one hundred and eightieth day manually or with conventional cutting tools for stone and sculpture.

Moreover, it is also possible to ornament this concrete to give it aesthetic effects by adding for example glass bottle sand or any other type of additive used in a conventional way for concretes as colorants.

The concrete according to the invention offers the advantage of permitting obtaining a uniform appearance and color in addition to casting in a layer, or as paving stones, etc.

This concrete which sets up progressively is now called "Possonnière stone—cuttable concrete" so as to distinguish it by its cutting properties from conventional concrete.

We claim:

1. Cuttable concrete adapted to be cut for several months with cutting and sculpting tools, comprising a mixture having a total volume $V_t$, said mixture including a volume V of mineral materials consisting essentially of crushed oolithic limestone, a volume V1 of hydraulic binder, and a volume V3 of water, wherein the binder volume V1 is less than the volume V of mineral materials, the water volume V3 is 30% to 90% of the volume V of mineral materials, and the sum of the water volume V3 and the mineral materials volume V represents 50 to 90% of the total volume $V_T$ of the mixture.

2. Cuttable concrete according to claim 1, wherein the hydraulic binder is selected from the group consisting of lime and Portland cement.

3. Cuttable concrete according to claim 1, wherein the volume V1 of the binder is 20 to 60% of the volume V of mineral materials.

4. Cuttable concrete according to claim 1, wherein the mixture further comprises a volume V2 of fillers.

5. Cuttable concrete according to claim 4, wherein the volume V2 of fillers is 0 to 40% of the volume V of oolithic limestone material present in the mixture.

6. Cuttable concrete according to claim 1, wherein the mixture is combined with molded plaster and used as a paving stone.

7. Cuttable concrete according to claim 1, wherein the volume V3 of water is equal to 40% of the volume V of crushed oolithic limestone material, and the concrete is used as a coating.

8. Cuttable concrete according to claim 6, wherein the volume V3 of water is about 70% of the volume V of crushed oolithic limestone material, and the concrete is cast within coffers for the production of supporting frameworks.

9. Cuttable concrete according to claim 1, wherein the concrete is used to produce refractory molds for casting of materials.

* * * * *

UNITED STATES PATENT AND TRADEMARK OFFICE
CERTIFICATE OF CORRECTION

PATENT NO. : 5,478,390
DATED      : December 26, 1995
INVENTOR(S) : William CRUAUD et al.

It is certified that error appears in the above-indentified patent and that said Letters Patent is hereby corrected as shown below:

On the title page, in Item [22] PCT Filed, change "Jan. 1, 1993" to --Jan. 7, 1993--.

Signed and Sealed this

Twelfth Day of March, 1996

Attest:

BRUCE LEHMAN

*Attesting Officer*          *Commissioner of Patents and Trademarks*